Patented Aug. 1, 1950

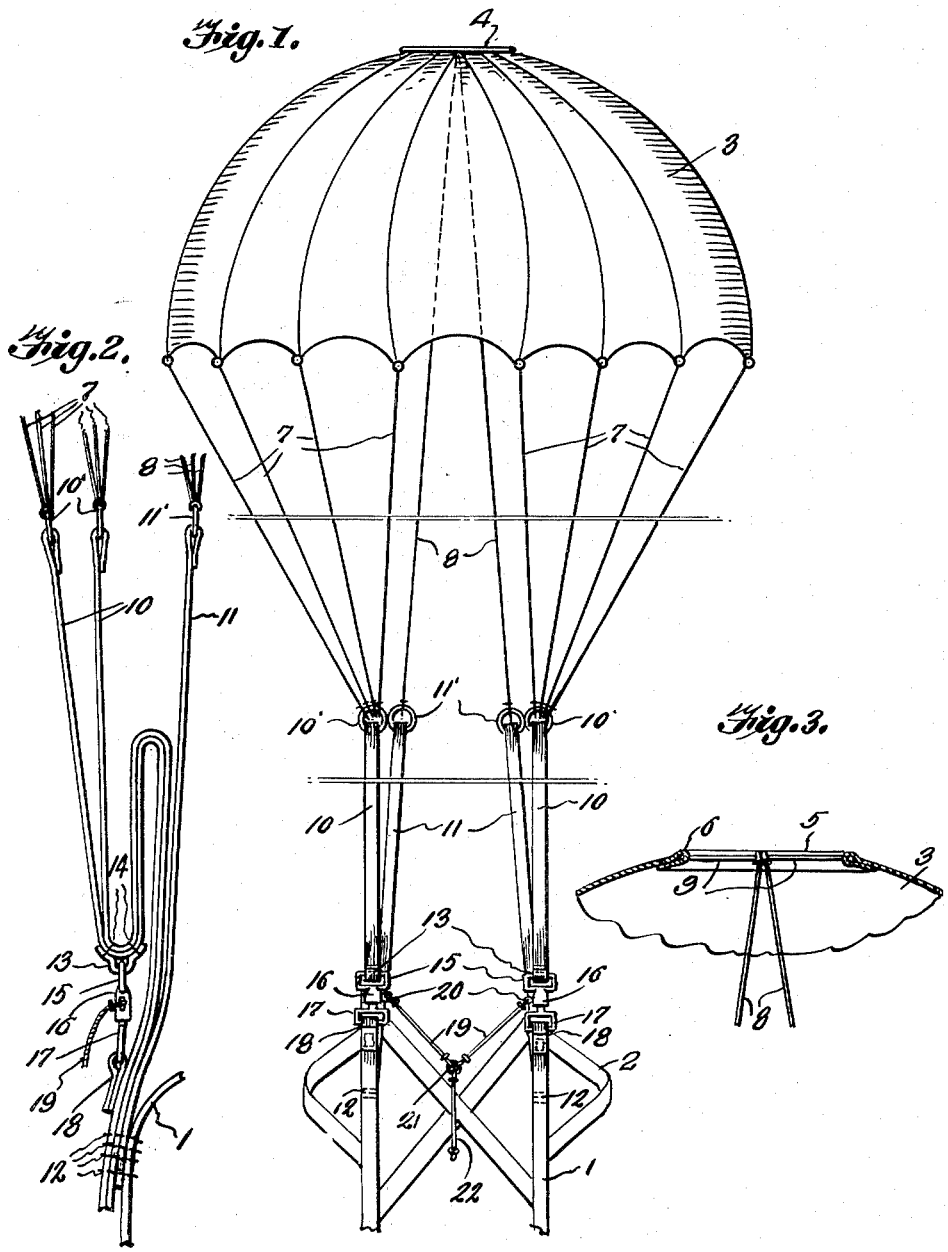

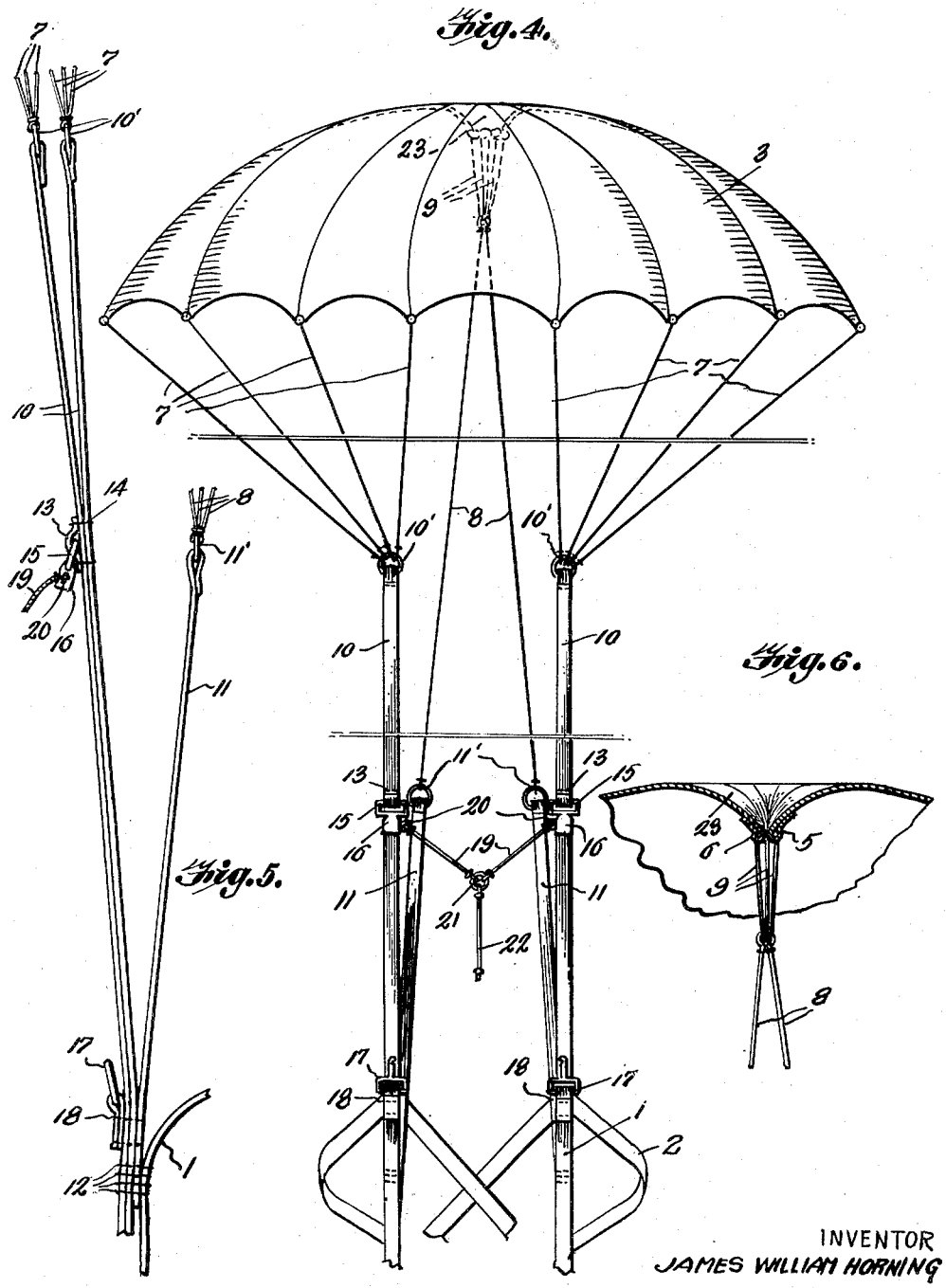

2,517,488

UNITED STATES PATENT OFFICE 2,517,488

MEANS TO CONTROL THE RATE OF OPENING OF A PARACHUTE

James W. Horning, Bloomsburg, Pa., assignor of one-half to Ernest D. Ney, Shickshinny, Pa.

Application March 10, 1948, Serial No. 14,049

6 Claims. (Cl. 244—152)

This invention relates to means to control the rate of opening of a parachute and it is one object of the invention to provide a parachute of such construction that after an aviator has jumped from an airplane, or other aircraft, and fallen as far as he considers safe at the original rate of speed he may check the speed of descent and thus make a safe landing without striking the ground with violent force.

At the present time parachutes are in use by means of which the speed at which an aviator falls may be checked, but these parachutes have more than one canopy and shrouds connected with the harness and one parachute is released when the aviator jumps from the airplane, the second parachute being released after the aviator has fallen a certain distance. This makes it necessary to provide two parachutes, which adds to the weight and cost of the equipment, and in addition the second parachute is liable to become entangled with the first when released and thus prevent proper functioning of both parachutes.

Therefore another object of the invention is to provide a device of this character wherein a single parachute is used and so connected with the harness that after an aviator has fallen a certain distance and desires to check the speed at which he is falling the canopy may be allowed to spread so that its effective diameter is increased and, at the same time, the air vent or opening at the center of the canopy closed so that escape of air at this point will be prevented.

Another object of the invention is to provide improved risers to which shroud lines are attached, one set of risers being connected with shroud lines attached at their upper ends to the canopy near the air vent and the other set of risers being of greater length than the first set and connected with shroud lines which are attached to canopy about the periphery thereof so that when the long risers are released from a shortened condition in which they are initially secured the canopy will pull them upwardly and the canopy become expanded to increase its effective diameter and thus decrease the speed at which the aviator falls.

Another object of the invention is to provide a parachute having a canopy formed of a predetermined quantity of fabric customarily used for canopies of a certain diameter which may be caused to expand to produce an increased effective diameter and thus allow a parachute having an initial effective area to support a man of a certain weight to be safely used by a man who would require a larger parachute in order to make a safe landing.

Another object of the invention is to provide a parachute which is of simple construction, very efficient in operation, and easy to operate.

The invention is illustrated in the accompanying drawings wherein:

Fig. 1 is a view in elevation showing the improved parachute in its initial condition after a jump has been made from an airplane.

Fig. 2 is a fragmentary view showing the long risers releasably secured in a shortened condition.

Fig. 3 is a fragmentary sectional view showing the air vent or opening of the canopy in its normally opened condition for allowing escape of air upwardly through the center of the canopy.

Fig. 4 is a view similar to Figure 1 showing the long risers released and the canopy extended to an increased effective diameter.

Fig. 5 is a view similar to Figure 2 showing the long risers released and drawn upwardly to an extended condition.

Fig. 6 is a fragmentary sectional view similar to Figure 3 and showing the air vent or opening at the center of the canopy closed.

This improved parachute has a harness 1 which is of conventional formation and includes the usual shoulder straps 2. The canopy 3 may be of any diameter desired and at its center is formed with the usual air vent of opening 4 which allows air to escape and thus prevents the canopy from being torn by air pressure and strains during opening of the canopy when a jump is made from an airplane. Portions of the canopy about the opening 4 are turned inwardly to form a hem 5 through which a rope 6 passes in order to reinforce the canopy about the opening. Shroud lines 7 are attached at their upper ends to the canopy and are spaced from each other circumferentially of the canopy about the peripheral edge thereof. Inner shroud lines 8 extend downwardly from the canopy at the air vent and have their upper ends connected with lines 9 which extend diametrically across the air vent 4 and cross each other at the center of the air vent where the shroud lines 8 are connected with them. Referring to Figures 3 and 6 it will be seen that when a jump is made the vent or opening will be initially fully open so that air may escape upwardly through the vent to prevent tearing of the canopy and that after a drop of predetermined distance the air vent may be closed to prevent such escape of air through the canopy. Any number of inner shroud lines may be provided and since they are connected with the lines 9 where they intersect each other at the center of the air vent downward pull upon the lines 9 by the inner shroud lines 8 will cause portions of the canopy about the vent to be drawn downwardly towards each other and close the vent when the outer shroud lines shift upwardly and the canopy is thereby allowed to expand to the extended condition shown in Figure 4.

In order to control opening movement of the canopy and connect the shroud lines 7 and 8 with the harness there have been provided risers 10 and 11 which are formed of thick canvas, leather, or other suitable material and have their lower ends disposed one upon another and firmly secured to the harness 1 by stitches or equivalent securing means 12. Upper ends of the risers carry rings 10' and 11' and to these rings are secured lower ends of the shroud lines 7 and 8. Referring to Figures 2 and 5 it will be seen that the risers 10 extend in face to face engagement with each other for a suitable distance, which has been shown as approximately one-half the length of the risers. At the upper ends of the contacting portions of the risers 10 is disposed a shaft strap 13 which is secured by stitches 14 and forms a loop, and through this loop or eye 13 is mounted a ring 15 carried by the upper portion of a quickly releasable fastener 16. The quick release fastener may be of any desired construction and includes in its construction a lower member 17 carried by a looped strap or eye 18 secured to the companion shoulder strap of the harness in front of the secured lower ends of the risers. Cords 19 are attached to the pins 20, or equivalent latch releasing members of the fasteners 16, and these cords are connected with a ring 21 from which extends a pull line or cord 22 of such length that it may be conveniently grasped and pulled upon when the canopy is to be allowed to expand.

When this improved parachute is in use the canopy and the shroud lines and risers are stowed in the usual pack (not shown) and the harness put on by the aviator, paratrooper, or other passenger, in the usual manner. When a jump is made the canopy is released from the pack by pulling upon the usual rip cord and as the canopy is released it carries with it the shroud lines and the risers and eventually assumes the position shown in Figure 1. When the canopy is in the condition shown in this figure the air vent or opening 4 is open and air may flow upwardly through the same and thus relieve strains which might cause the canopy to become torn and also relieve the aviator from severe strains caused by initial opening of the canopy and sudden stopping of his fall. After the canopy has opened the aviator may immediately pull upon the cord 22, if a short jump has been made, or he may wait until he has dropped to a level considerably lower than the height at which the jump was made. When pull is exerted upon the pull cord the two quick release fasteners will be actuated to effect separation of their upper and lower sections and folded portions of the risers 10 will be released and thus allow these risers to be pulled upwardly to a fully raised or extended condition. The canopy spreads and flattens as its marginal portions move upwardly and since the risers 11 remain the same length the shrouds 8 will cause the central portion of the canopy to be subjected to pull which will close the air vent and form a downwardly extending portion 23 of inverted conical shape at the center of the canopy. By comparing Figure 4 with Figure 1 it will be seen that the effective diameter of the canopy has been increased to such an extent that it has a greatly increased weight sustaining ability and will serve very effectively to check the rate of speed at which a person falls and allow a landing to be made upon the ground without danger of a leg being broken. Since the canopy is formed with a depending portion 23 at its center when the air vent is closed, air moving upwardly under the central portion of the extended canopy will be deflected towards edges of the canopy and an uplifting force exerted which will add to the weight sustaining action of the canopy. The added uplift imparted to the canopy will also allow a parachute having a canopy which would ordinarily be suitable for use by a man of medium weight to be used by a man of greater weight and thus make it unnecessary to provide parachutes having canopies of different sizes at an air field, and danger of a person being supplied with a parachute which is too small for his weight will be eliminated.

Having thus described the invention, what is claimed is:

1. In a parachute, a harness, risers carried by said harness, certain of said risers being of greater length than the remaining risers, a canopy having an opening at its center constituting an air vent, shroud lines of permanent length connecting upper ends of the short risers with the canopy at points about the air vent, shroud lines connecting upper ends of the long risers with the canopy at points spaced from each other about the periphery of the canopy, and companion fastener members carried by the harness and the long risers detachably connected with each other for releasably securing the long risers in a shortened condition to prevent complete extension of the canopy when initially moving to an opened position, the shroud lines extending from the short risers exerting pull upon the canopy to close the air vent and form a depending air deflector at the center of the canopy when the companion fastener members are released and marginal portions of the canopy thereby allowed to move upwardly and outwardly to a fully expanded position.

2. In a parachute, a harness, short risers and long risers carried by said harness, manually releasable fasteners securing the long risers in a shortened condition, a canopy formed with an air vent at its center, shroud lines connecting the long risers with the peripheral edge portion of said canopy, and shroud lines connecting the short risers with the canopy at points spaced from each other about the air vent and exerting downward pull to draw the portion of the canopy surrounding the air vent downwardly to close the air vent and form a downwardly tapered air deflector when the long risers are released and allow the canopy spread to a fully extended position.

3. In a parachute, a harness, a canopy formed with an air vent, long members connecting the harness with peripherial portions of the canopy and short members connecting the harness with the canopy at points spaced from each other about the vent opening, and fasteners for releasably holding the long members connected with the peripherial portions of the canopy in temporarily shortened condition and being manually releasable to permit upward movement of the said long members to a fully extended condition and thereby allow the canopy to spread to a fully extended position while the short connecting members exert downward pull upon portions of the canopy about the vent and form a depending air deflector and constrict the vent.

4. In a parachute, a harness, a canopy formed with an air vent, short risers and long risers carried by shoulder straps of the harness, shroud lines connecting the long risers with the canopy at points about the periphery thereof, shroud lines connecting the short risers with the canopy at points adjacent the air vent, and fasteners having lower members carried by the shoulder straps and upper members carried by the long risers at points spaced from lower ends thereof whereby lower portions of the long risers may be doubled and folded downwardly and the said upper fastener members detachably engaged with their companion lower fastener members and releasably hold the long risers in foreshortened condition and temporarily prevent complete expansion of the canopy and closing of the air vent when a jump is made by a person wearing the parachute.

5. In a parachute, a harness, a canopy formed with a central air vent, suspension members connecting the harness with peripherial portions of the canopy and movable from a foreshortened condition to an extended condition, manually releasable means for holding the said members foreshortened, and pull members shorter than the suspension members connecting the harness with the central portion of the canopy surrounding the vent and serving to exert downward pull and close the vent while forming of the said central portion of the canopy a depending downwardly tapered air deflector during movement of the suspension members to an extended position and resultant movement of the canopy to a fully extended position.

6. In a parachute, a harness, a canopy formed with an air vent at its center, suspension members connecting the harness with the canopy at points about the periphery thereof, means to releasably hold said members foreshortened to prevent spreading of the canopy to a fully extended condition when a jump is made, and means for automatically exerting downward pull upon the portion of the canopy surrounding the air vent to close the vent and form a depending air deflector during spreading of the canopy in response to movement of the suspension members to a fully extended position.

JAMES W. HORNING.

REFERENCES CITED

The following references are of record in the file of this patent:

UNITED STATES PATENTS

| Number | Name | Date |
| --- | --- | --- |
| 2,116,037 | Nonaka | May 3, 1938 |
| 2,405,333 | Sheridan | Aug. 6, 1946 |

FOREIGN PATENTS

| Number | Country | Date |
| --- | --- | --- |
| 832,511 | France | July 4, 1938 |
| 344,591 | Germany | Nov. 25, 1921 |